Sept. 3, 1968　　　K. WEINBERGER　　　3,400,195
METHOD AND APPARATUS FOR RE-SHAPING A GARLAND
Filed April 7, 1964

United States Patent Office 3,400,195
Patented Sept. 3, 1968

3,400,195
METHOD AND APPARATUS FOR RE-SHAPING A GARLAND
Karl Weinberger, Roth, Bavaria, Germany, assignor to Riffelmacher & Weinberger, Roth, Bavaria, Germany, a firm
Filed Apr. 7, 1964, Ser. No. 358,004
Claims priority, application Germany, Sept. 11, 1963, R 36,092
3 Claims. (Cl. 264—320)

ABSTRACT OF THE DISCLOSURE

Method and apparatus are disclosed for reshaping the cross-section of a plastic garland. The garland is passed between a pair of disc-shaped die members providing a peripheral groove, mounted upon a hollow shaft having heating means disposed therein. The die members are biased toward radial engagement with each other to cause the fibers of the garland to re-orient from their original orientation to an angle providing a different cross-section.

---

The invention relates to a method of producing ornamental articles, such as balls, stars and the like for adornment and decorative purposes, in which a string of approximately V-shaped section is formed from a garland, in that all fibres are set at an acute angle to the stem of the garland by means of a shaping disc with a peripheral groove, and then a ring-shaped basic shape is formed therfrom by rolling the stem into the shape of a ring.

The invention also relates to an apparatus for carrying out the method.

In the manufacture of ornamental lametta articles, metal foils and wires were hitherto used and the fibres of the lametta garlands were formed therefrom.

An objection thereto is that these garlands, owing to their metallic character, are not proof against corrosion and are also very sensitive to pressure and jolting. This had a detrimental effect with regard to packing and despatch because the finished ornamental articles had to be very carefully handled in order to avoid spoiling their shape.

The object of the invention is to produce an expedient and to enable ornamental articles to be made which are proof against corrosion, not sensitive to pressure and jolting and non-inflammable. It is a question of producing ornamental articles which retain their shape and can be used for a longer time than the ornamental articles mentioned above.

This object can be attained according to the invention by forming a garland from fibres of thermoplastic material and passing it through the peripheral groove of a heated shaping disc.

For carrying out this method an apparatus has proved very practical in which the shaping disc is mounted on a hollow shaft in which a heating cartridge is inserted.

A shaping disc is preferably used which is composed of two halves mounted side by side on the hollow shaft, the peripheral groove being formed by the gap between the two disc halves. These disc halves are pressed together by springs so that the plastic string introduced between them is simultaneously subjected to heat and pressure.

Ornamental articles made according to the invention possess the advantage that, owing to the elasticity of the fibres made from a thermoplastic foil, for example a polyvinyl chloride foil, they are practically insensitive to pressure and jolts because the fibres, due to their resiliency, always return into their original position. Such finished articles can therefore be stored and packed more quickly and with less waste than heretofore.

An apparatus for carrying out the method according to the invention is illustrated diagrammatically by way of example in the accompanying drawing, in which—

A frame $a$, which is fixed in a holder on the workbench by means of a supporting arm $b$ carries a hollow shaft $c$ which can be internally heated. A resistance heating system and a known heating cartridge $d$ therefor are preferably used.

Tow rotary disc halves $e'$ and $e^2$, which together form the shaping disc, are mounted on the hollow shaft $c$. The gap $f$ between the two disc halves $e'$ and $e^2$ produces a peripheral groove which serves for shaping the garland.

Figure 1:
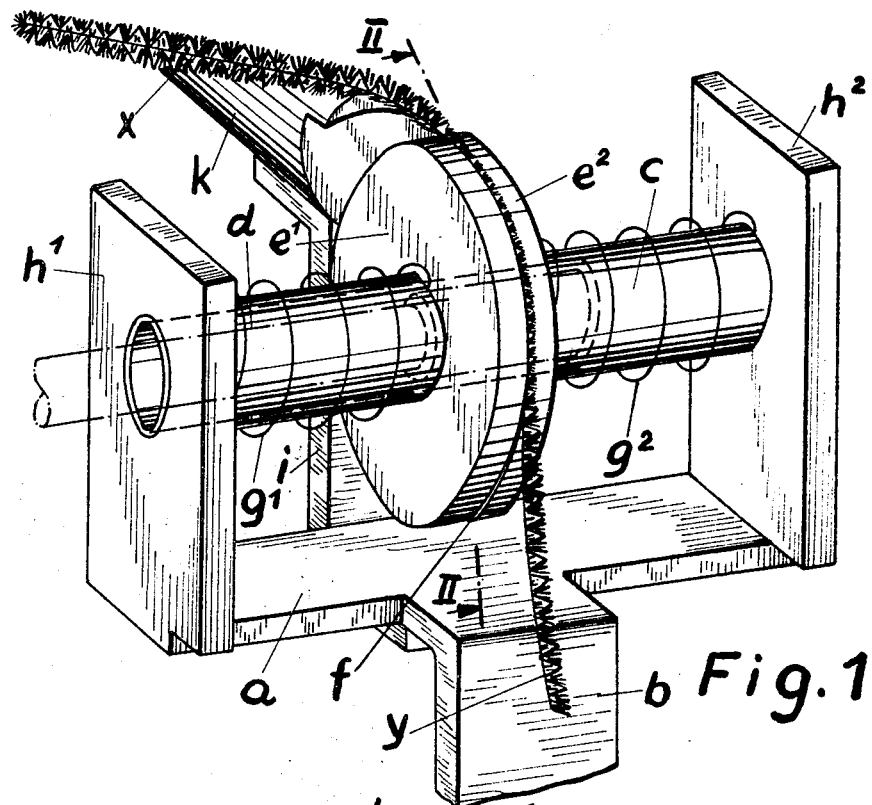
FIG. 1 shows the apparatus with shaping disc and heated hollow shaft.
Figure 2:
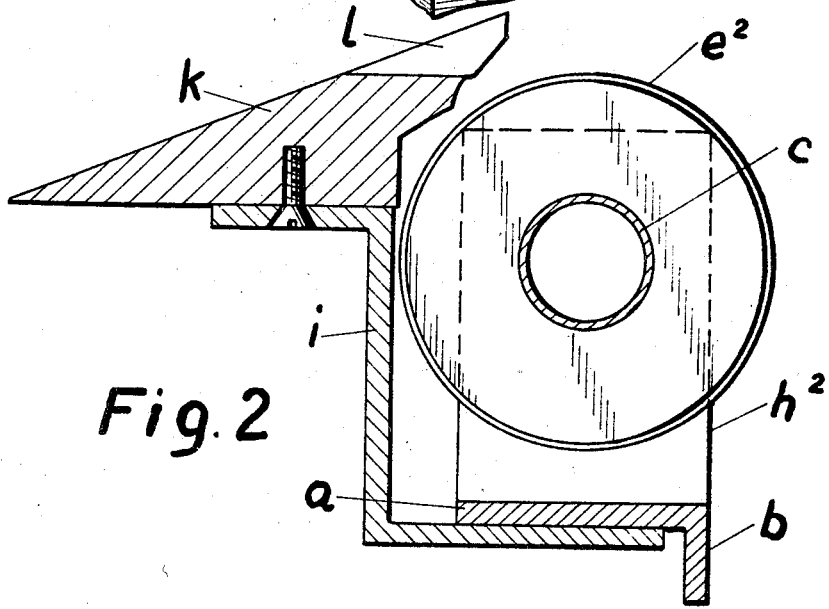
FIG. 2 is a longitudinal section taken on line II—II of FIG. 1.

The garland is introduced between the disc halves $e'$ and $e_2$ as in the state shown at $x$ in FIG. 1 and then leaves these disc halves in the state shown at $y$, that is with a V-shaped cross-section.

As the shaping is no longer effected by means of a peripheral groove cut in a one-piece shaping disc, as heretofore, but in the gap between the two disc halves $e'$ and $e^2$ forming the shaping disc according to the invention, the garland can be shaped as required either near the periphery of the disc halves or further inwards up to quite close to the hollow shaft $c$. Whether the shaping is effected at a short or at a great distance from the hollow shaft will naturally also depend upon the heat it is desired to apply to the garland.

In order that the garland may be subjected not only to heating effect but also to pressure while it is being shaped, the two disc halves $e'$ and $e^2$ are pressed together by spring. In the example illustrated two springs $g'$ and $g^2$ are provided for this purpose which are mounted on the hollow shaft $c$ and bear against the cheeks $h$ and $h^2$ of the frame $a$.

To facilitate the introduction of the garland between the disc halves $e'$ and $e^2$, a guiding element $k$ with a central guiding channel can be provided on a supporting bracket.

The invention can be used both for plain and also for metallized plastic fibres.

What I claim is:

1. A method of reshaping the cross section of a synthetic plastic garland to form a garland which is V-shaped in cross section using a pair of disc-shaped die members rotatably mounted on a hollow shaft having a heating means disposed therein, said die members having spaced apart oppositely disposed radial faces, said method comprising: passing said garland between the radial faces of said pair of rotatably mounted disc-shaped die members, simultaneously heating said die members with said heating means and biasing said die members toward radial engagement with each other to re-orient the fibers of the garland from their original orientation with respect to the core of the garland to form an acute angle with respect to a plane through the core of the garland.

2. Apparatus for reshaping a synthetic plastic garland to form a garland which is V-shaped in cross section comprising:
   a base member having a pair of opposed spaced wall portions;
   a hollow shaft mounted between said wall portions;
   a pair of disc-shaped die members rotatably mounted on said shaft;
   means biasing said discs into radial engagement with each other; and means disposed within said hollow shaft for heating said die members.

3. Apparatus as defined by claim 2 and further including a guide means mounted on said base in alignment with the plane of radial engagement of said discs.

References Cited

UNITED STATES PATENTS

| 3,216,038 | 11/1965 | Gould et al. | 15—159 |
| 638,361 | 12/1899 | Schumann | 93—1.5 |
| 1,606,271 | 11/1926 | Stratford | 264—285 X |
| 2,240,274 | 4/1941 | Wade | 156—200 X |
| 2,613,139 | 10/1952 | Herold et al. | 161—12 X |
| 3,200,662 | 8/1965 | Rockoff et al. | 161—95 X |
| 2,332,833 | 10/1943 | Unger | 161—176 X |
| 3,194,716 | 7/1965 | Lefevre | 161—177 X |

ROBERT F. BURNETT, *Primary Examiner.*

W. A. POWELL, *Assistant Examiner.*